US012597013B2

(12) United States Patent
Cheng et al.

(10) Patent No.: US 12,597,013 B2
(45) Date of Patent: Apr. 7, 2026

(54) USING PARTITIONS WITHIN A DISTRIBUTED DATABASE

(71) Applicant: Capital One Services, LLC, McLean, VA (US)

(72) Inventors: Lin Ni Lisa Cheng, Great Neck, NY (US); Xiaoguang Zhu, New York, NY (US); Samuel Rapowitz, Roswell, GA (US)

(73) Assignee: Capital One Services, LLC, McLean, VA (US)

( * ) Notice: Subject to any disclaimer, the term of this patent is extended or adjusted under 35 U.S.C. 154(b) by 234 days.

(21) Appl. No.: 18/061,170

(22) Filed: Dec. 2, 2022

(65) Prior Publication Data

US 2024/0185221 A1 Jun. 6, 2024

(51) Int. Cl.
*G06Q 20/36* (2012.01)
*G06Q 20/38* (2012.01)

(52) U.S. Cl.
CPC ........... *G06Q 20/36* (2013.01); *G06Q 20/389* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 11,288,736 B1 * | 3/2022 | Jette | | H04L 9/50 |
| 11,829,961 B1 * | 11/2023 | Wood | | H04L 9/50 |

| | | | | |
|---|---|---|---|---|
| 12,086,630 B2 * | 9/2024 | Hwang | ................. | G06F 9/4868 |
| 2020/0065763 A1 * | 2/2020 | Rosinzonsky | ........ | H04L 63/123 |
| 2020/0402025 A1 * | 12/2020 | Wang | ................... | G06Q 20/389 |
| 2022/0261882 A1 * | 8/2022 | Youb | ...................... | G06Q 50/16 |
| 2022/0284008 A1 * | 9/2022 | Treitlinger | .......... | G06F 16/2379 |
| 2022/0398666 A1 * | 12/2022 | Apollo | ................... | G06Q 20/02 |
| 2023/0004954 A1 * | 1/2023 | Ammatanda | ........ | G06Q 20/108 |
| 2023/0267452 A1 * | 8/2023 | Isogawa | ............... | G06Q 20/405 |
| | | | | 705/75 |

(Continued)

OTHER PUBLICATIONS

Chitra, Building and Running a DAO: Why Governance Matters, Nov. 3, 2021 (Year: 2021).*

(Continued)

*Primary Examiner* — Patrick Mcatee
*Assistant Examiner* — Christine Dang
(74) *Attorney, Agent, or Firm* — Harrity & Harrity, LLP

(57) ABSTRACT

In some implementations, a device may receive information indicating a set of parameters for a partition of a decentralized autonomous organization (DAO) implemented by a distributed database. The set of parameters may include a first parameter indicating a condition for completion of the partition and a second parameter indicating a digital asset wallet of a recipient that is to receive digital assets associated with the partition upon completion of the partition. The device may cause a smart contract, associated with the partition, to be added to the distributed database. The smart contract may include executable code that codifies the set of parameters. The smart contract may be configured to cause, responsive to satisfaction of the condition for completion of the partition, a record to be added to an additional distributed database indicating an association between a digital asset wallet of the partition and the digital asset wallet of the recipient.

20 Claims, 9 Drawing Sheets

(56)  References Cited

U.S. PATENT DOCUMENTS

2023/0289779 A1*   9/2023   Weiksner  ..........  G06Q 20/3674

OTHER PUBLICATIONS

Liu, What is a SubDAO? A Way to Keep Governance Decentralized, Nov. 4, 2022 (Year: 2022).*

SubDAO Protocol, Breakthrough and Progress of SubDAO in Development, Sep. 30, 2021 (Year: 2021).*

* cited by examiner

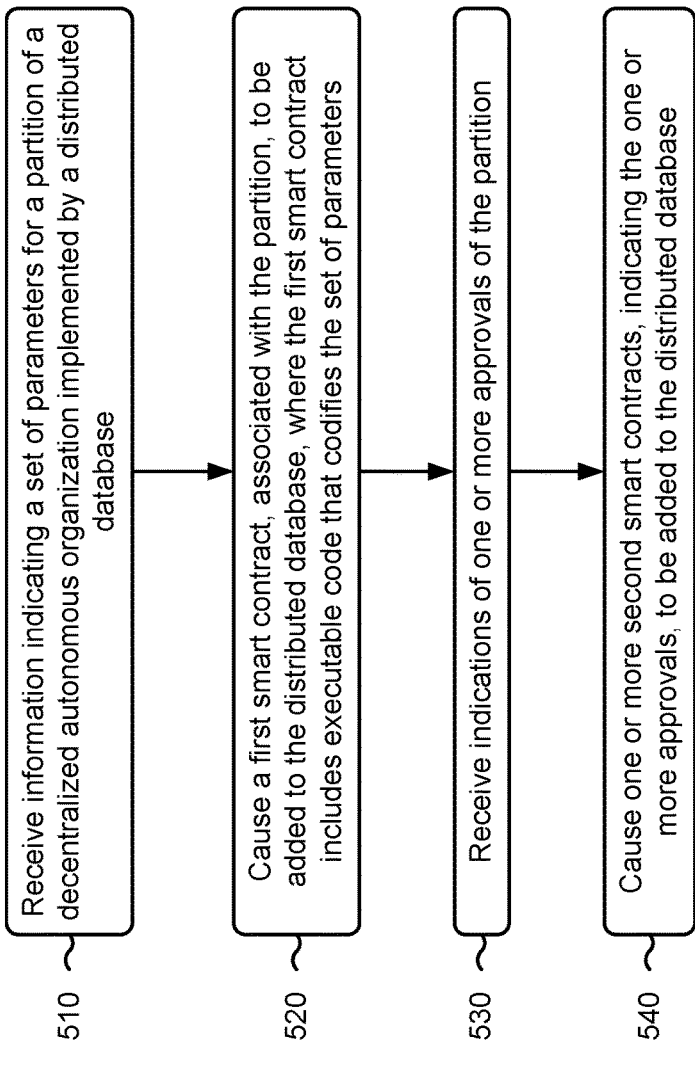

500

510 — Receive information indicating a set of parameters for a partition of a decentralized autonomous organization implemented by a distributed database 520 — Cause a first smart contract, associated with the partition, to be added to the distributed database, where the first smart contract includes executable code that codifies the set of parameters 530 — Receive indications of one or more approvals of the partition 540 — Cause one or more second smart contracts, indicating the one or more approvals, to be added to the distributed database

FIG. 5

USING PARTITIONS WITHIN A DISTRIBUTED DATABASE

BACKGROUND

A blockchain is a distributed database that maintains a continuously-growing list of records, called blocks, that may be linked together to form a chain. Each block in the blockchain may contain a timestamp and a link to a previous block and/or transaction. The blocks may be secured from tampering and revision. In addition, a blockchain may include a secure transaction ledger database shared by parties participating in an established, distributed network of computers. A blockchain may record a transaction (e.g., an exchange or transfer of information) that occurs in the network, thereby reducing or eliminating the need for trusted/centralized third parties. In some cases, the parties participating in a transaction may not know the identities of any other parties participating in the transaction but may securely exchange information. Further, the distributed ledger may correspond to a record of consensus with a cryptographic audit trail that is maintained and validated by a set of independent computers.

SUMMARY

Some implementations described herein relate to a system for using partitions within a distributed database. The system may include one or more memories and one or more processors communicatively coupled to the one or more memories. The one or more processors may be configured to receive information indicating a set of parameters for a partition of a decentralized autonomous organization (DAO) implemented by a distributed database. The set of parameters may include a first parameter indicating an approval threshold for creating the partition, a second parameter indicating a condition for completion of the partition, and a third parameter indicating a digital asset wallet of a recipient that is to receive digital assets associated with the partition upon completion of the partition. The one or more processors may be configured to cause a first smart contract, associated with the partition, to be added to the distributed database, where the first smart contract includes executable code that codifies the set of parameters. The one or more processors may be configured to receive indications of one or more approvals of the partition. The one or more processors may be configured to cause one or more second smart contracts, indicating the one or more approvals, to be added to the distributed database. The first smart contract may be configured to cause, responsive to the one or more second smart contracts indicating satisfaction of the approval threshold, creation of a digital asset wallet for the partition and a record to be added to an additional distributed database indicating an association between the digital asset wallet for the partition and a digital asset wallet for the decentralized autonomous organization. The first smart contract may be configured to cause, responsive to satisfaction of the condition for completion of the partition, another record to be added to the additional distributed database indicating a new association between the digital asset wallet of the partition and the digital asset wallet of the recipient.

Some implementations described herein relate to a method of using partitions within a distributed database. The method may include receiving information indicating a set of parameters for a partition of a DAO implemented by a distributed database. The set of parameters may include a first parameter indicating a condition for completion of the partition and a second parameter indicating a digital asset wallet of a recipient that is to receive digital assets associated with the partition upon completion of the partition. The method may include causing a smart contract, associated with the partition, to be added to the distributed database, where the smart contract includes executable code that codifies the set of parameters. The smart contract may be configured to cause creation of a digital asset wallet for the partition and a record to be added to an additional distributed database indicating an association between the digital asset wallet of the partition and a digital asset wallet of the decentralized autonomous organization. The smart contract may be configured to cause, responsive to satisfaction of the condition for completion of the partition, another record to be added to the additional distributed database indicating a new association between the digital asset wallet of the partition and the digital asset wallet of the recipient.

Some implementations described herein relate to a non-transitory computer-readable medium that stores a set of instructions for using partitions within a distributed database. The set of instructions, when executed by one or more processors of a device, may cause the device to receive information indicating a set of parameters for a partition of a DAO implemented by a distributed database. The set of parameters may include a first parameter indicating a condition for completion of the partition and a second parameter indicating a digital asset wallet of a recipient that is to receive digital assets associated with the partition upon completion of the partition. The set of instructions, when executed by one or more processors of the device, may cause the device to cause a smart contract, associated with the partition, to be added to the distributed database, where the smart contract includes executable code that codifies the set of parameters. The smart contract may be configured to cause, responsive to satisfaction of the condition for completion of the partition, a record to be added to an additional distributed database indicating an association between a digital asset wallet of the partition and the digital asset wallet of the recipient.

BRIEF DESCRIPTION OF THE DRAWINGS

FIG. 5 is a flowchart of an example process associated with using partitions within a distributed database, in accordance with some embodiments of the present disclosure.

DETAILED DESCRIPTION

Figure 1A:
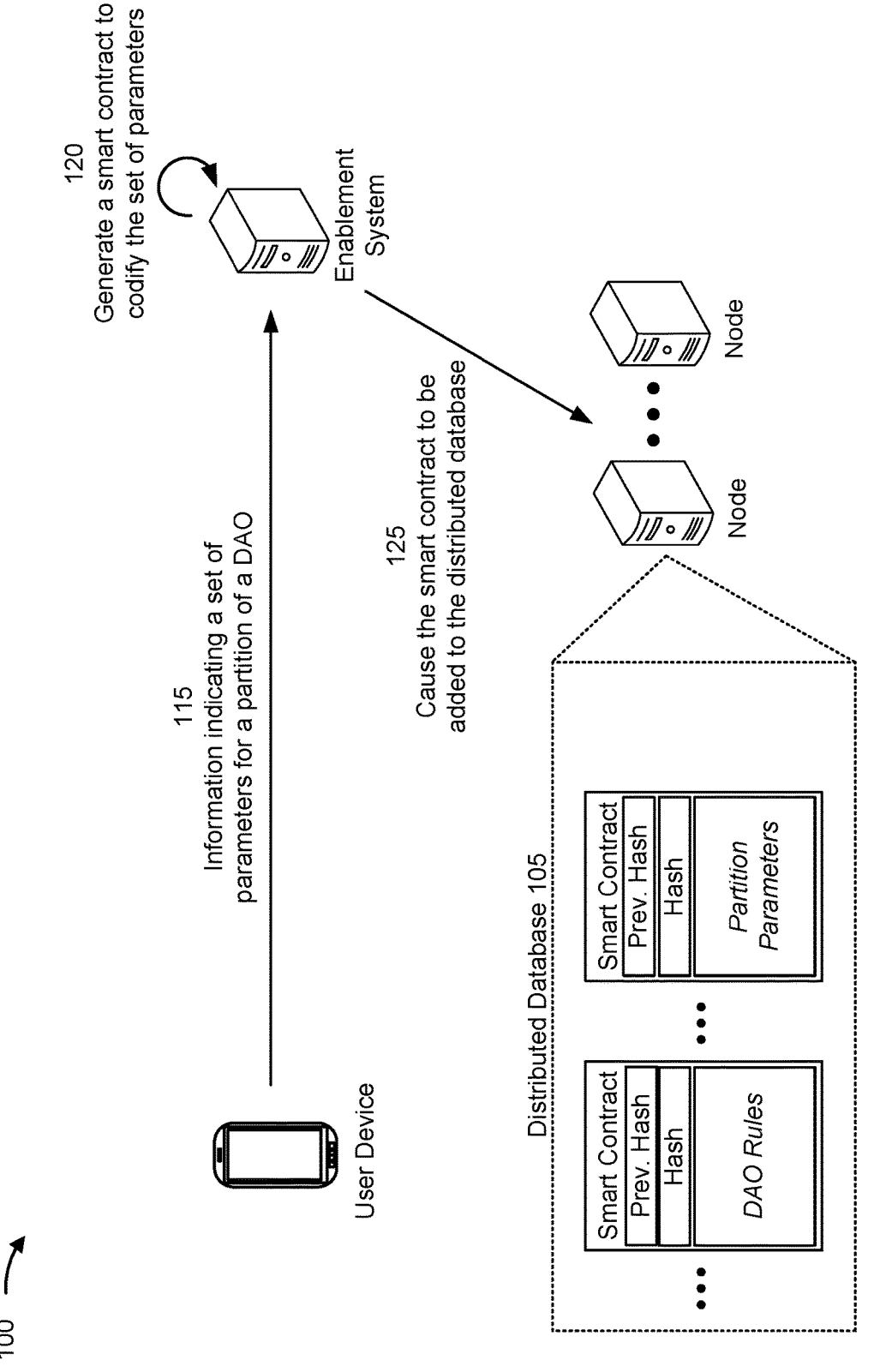
FIGS. 1A-1E are diagrams of an example associated with using partitions within a distributed database, in accordance with some embodiments of the present disclosure.

The following detailed description of example implementations refers to the accompanying drawings. The same reference numbers in different drawings may identify the same or similar elements.

Some implementations described herein enable the use of partitions within a distributed database (e.g., a blockchain) using smart contracts. The smart contracts may include executable code configured to automatically cause the creation and/or the transfer of separate digital asset wallets for each partition upon the occurrence of defined conditions relating to the distributed database. The use of the partitions, and the separate digital asset wallets therefor, may facilitate a reduction to a volume of records in the distributed database, thereby conserving processing resources and/or storage resources used in implementing the distributed database.

A distributed database (e.g., a blockchain) may be configured to enable the use of a smart contract, which may refer to a record of the distributed database that includes executable code configured to perform one or more actions based on the satisfaction of one or more conditions. The smart contract, once stored in the distributed database, may be immutable and resilient to tampering. In some examples, a distributed database may be used to implement a decentralized autonomous organization (DAO), which may refer to an entity that is constructed by rules encoded as a computer program. For example, one or more smart contracts in the distributed database may include code configured to execute the rules of the DAO. Transactions of the DAO may be conducted via the distributed database, and records of the DAO may be maintained in the distributed database. Control of the DAO may be exercised by owners of tokens associated with the DAO, which may be referred to herein as "governance tokens." Digital assets (e.g., cryptocurrency assets) of the DAO may be maintained using a single digital asset wallet (e.g., a cryptocurrency wallet) associated with the DAO (which may be referred to as a "treasury" of the DAO). Thus, using this digital asset wallet, the DAO may perform transactions involving digital assets with other DAOs, individuals, or entities.

In some cases, the DAO may be controlled by hundreds, thousands, or even millions of token holders with differing objectives. These token holders may request, via records added to the distributed database, usage of digital assets of the DAO and/or funding of digital assets to the DAO for various purposes. Because the DAO uses the single digital asset wallet for transactions, numerous records may be added to the distributed database to facilitate tracking of the requests, tracking of inflows and outflows associated with the digital asset wallet in connection with the requests, and tracking of digital assets pledged to or from the digital asset wallet in connection with the requests. These records create additional complexity in the distributed database and impose an excessive processing and storage burden on nodes that implement the distributed database.

Some implementations described herein enable the use of partitions within a distributed database. In particular, implementations described herein enable a partition of a DAO using a smart contract added to the distributed database. The partition of the DAO may represent a subordinate division of the DAO, and the partition may have a particular purpose that falls within a general purpose of the DAO. For example, if a purpose of the DAO is to provide charitable donations, a purpose of a partition of the DAO may be to raise donations for animal shelters.

The smart contract associated with the partition may include executable code relating to a set of parameters for the partition. For example, the set of parameters may include a parameter indicating a condition for creation of the partition and/or a parameter indicating a condition for completion of the partition. The smart contract may be configured to automatically cause creation of a digital asset wallet particular to the partition (e.g., upon satisfaction of the condition for creation of the partition). The smart contract may also be configured to automatically cause a record to be added to an additional distributed database indicating an association between the partition's digital asset wallet and the DAO's digital asset wallet (e.g., upon satisfaction of the condition for creation of the partition). In this way, digital assets associated with the partition may be isolated from other digital assets of the DAO, while at the same time maintaining an association between the partition and the DAO. Moreover, the smart contract may be configured to automatically cause another record to be added to the additional distributed database indicating a new association between the partition's digital asset wallet and a digital asset wallet of a recipient of digital assets of the partition (e.g., upon satisfaction of the condition for completion of the partition).

Thus, some implementations described herein facilitate transfer of the partition's digital asset wallet (e.g., in its entirety) rather than using individual transfers of digital assets from the DAO's digital asset wallet. In this way, additional records in the distributed database, that would have otherwise been needed to track individual transfers of digital assets associated with a single digital asset wallet of the DAO, may be eliminated. Accordingly, the partition reduces complexity in the distributed database and conserves processing resources and storage resources used in implementing the distributed database.

Moreover, digital records can be unreliable and subject to tampering (e.g., hacking), where evidence of that tampering may not be easily detected. Some implementations described herein improve reliability of digital records by using a distributed database to store digital records in a manner that makes tampering of the digital records difficult and easy to detect. For example, some implementations described herein use cryptographic techniques to improve security associated with digital records (e.g., to prevent or reduce tampering or fraud). Furthermore, digital records can be easily deleted or subject to data loss. Some implementations described herein improve resiliency and robustness of digital records and may prevent data loss by storing the digital records in a distributed manner, rather than in one or more isolated databases. Furthermore, verifying the authenticity of digital records (e.g., transactions or other exchanges) may be difficult. Some implementations described herein enable digital records to be verified (e.g., using digital signatures and/or cryptographic signatures).

In some cases, retrieval of digital records from, or addition of digital records to, an isolated database may be associated with significant latency, particularly if requests to retrieve or add digital records to the database originate from computers located a significant distance from a system implementing the database. This may result in data involved in a request to the database becoming stale before the request is completed or shortly thereafter, which may necessitate multiple requests being made to the database. Some implementations described herein improve data retrieval and storage speed by maintaining digital records in a distributed manner at nodes that are widely distributed across a region (e.g., globally distributed). Moreover, an isolated database may be able to handle only a limited number of simultaneous, or near-simultaneous, requests before resources associated with the database become overwhelmed, resulting in failure of a system implementing the database. Some implementations described herein use numerous distributed nodes (e.g., thousands or millions of nodes) to handle numerous simultaneous requests to retrieve or add digital records with improved performance and uptime.

FIGS. 1A-1E are diagrams of an example 100 associated with using partitions within a distributed database. As shown in FIGS. 1A-1E, example 100 includes one or more user devices, an enablement system, and a plurality of nodes of a distributed database system (e.g., a blockchain network). These devices are described in more detail in connection with FIGS. 3 and 4.

The distributed database system may include one or more distributed databases (e.g., blockchains) across the plurality of nodes. For example, each node may store a single copy of the distributed database(s). In some implementations, a first distributed database 105 (e.g., a first blockchain) may include a plurality of inter-related records (e.g., blocks) relating to a DAO. Thus, the DAO may be implemented by the first distributed database 105. For example, the first distributed database 105 may include a smart contract (or multiple smart contracts), which may be referred to herein as the DAO smart contract, that indicates rules for the DAO. For example, the rules may indicate a general purpose of the DAO, voting rules for the DAO, conditions for use of digital assets (e.g., cryptocurrency assets) held by the DAO, conditions for distribution of the digital assets, or the like. The rules may be codified (e.g., as compiled code) in the DAO smart contract. In addition, the DAO may be associated with a digital asset wallet (e.g., a treasury) that is identified by an address (e.g., a transaction address), and the address may be used to transfer digital assets (e.g., cryptocurrency assets) to, or from, the digital asset wallet of the DAO. The address may be based on a public key associated with the DAO. A digital asset wallet (e.g., a cryptocurrency wallet) may virtually store digital assets. The digital assets virtually stored by the digital wallet are those that a blockchain indicates are associated with an address of the digital asset wallet (e.g., based on transactions to the address and from the address that are recorded in the blockchain).

In some implementations, a second distributed database 110 (e.g., a second blockchain) may include a plurality of inter-related records (e.g., blocks) relating to associations between digital asset wallets (e.g., using addresses that identify the digital asset wallets). For example, a record may indicate an association between a first digital asset wallet and a second digital asset wallet, thereby indicating that the second digital asset wallet is controlled by (e.g., owned by) the first digital asset wallet. In some implementations, a schema used for the distributed database 105 may be different from a schema used for the distributed database 110. For example, the schema used for the distributed database 105 may be configured for recording transactions of digital assets (e.g., cryptocurrency assets) in the distributed database 105, and the schema used for the distributed database 110 may be configured for recording transactions of digital asset wallets in the distributed database 110.

As shown in FIG. 1A, and by reference number 115, the enablement system may receive, from a user device (e.g., associated with a user desiring to create a partition of the DAO), information indicating a set of parameters for a partition of the DAO. The partition of the DAO may represent a subordinate division of the DAO, and the partition may have a particular purpose that falls within a general purpose of the DAO. For example, if a purpose of the DAO is to provide charitable donations, a purpose of a partition of the DAO may be to raise donations for animal shelters. As another example, if a purpose of the DAO is to acquire a business, a purpose of a first partition of the DAO may be for acquisition of the business by a first bidder, a purpose of a second partition of the DAO may be for acquisition of the business by a second bidder, and so forth. In this example, the partitions may also provide secrecy as to the identities of the bidders.

The set of parameters may include one or more parameters indicating information associated with the partition, such as a parameter indicating a purpose of the partition (e.g., a purpose of raising donations for animal shelters), a parameter indicating a creator of the partition, or the like. The set of parameters may include a parameter indicating an approval threshold for creating the partition. For example, the approval threshold may indicate a quantity, a proportion, or the like, of token holders of the DAO from which approval is needed to create the partition. The set of parameters may include a parameter indicating a condition for completion of the partition (e.g., a funding goal). For example, the partition may be considered to be completed if a purpose of the partition is successful (e.g., the condition for completion is satisfied). In some implementations, the condition for completion of the partition may be that a value of digital assets associated with the partition satisfies a threshold. As an example, for a partition for raising donations for animal shelters, the condition for completion of the partition may be raising a particular monetary value in donations. Alternatively, the condition for completion of the partition may be a particular time period (e.g., one year) elapsing from creation of the partition.

The set of parameters may include a parameter indicating one or more digital asset wallets of one or more recipients that are to receive digital assets (e.g., cryptocurrency assets) associated with the partition upon completion of the partition. For example, for a partition for raising donations for animal shelters, a recipient may be an animal shelter. In some implementations, when the parameter indicates multiple recipients' digital asset wallets, the parameter may indicate proportions of the digital assets that are to be received by each recipient's digital asset wallet. In some implementations, when the parameter indicates multiple recipients' digital asset wallets, the parameter may indicate one or more conditions that indicate which of the multiple recipients' digital asset wallets are to receive the digital assets. For example, the parameter may indicate that a digital asset wallet of a recipient is to receive the digital assets upon completion of the partition if a first condition is satisfied (e.g., a first monetary threshold associated with the partition is satisfied), and indicate that a digital asset wallet of a different recipient is to receive the digital assets upon completion of the partition if a second condition is satisfied (e.g., a second monetary threshold associated with the partition is satisfied). A digital asset wallet of a recipient may be identified by an address (e.g., a transaction address) that is based on a public key associated with the recipient.

In some implementations, the set of parameters may include a parameter indicating a condition for expiration of the partition (e.g., to wind up the partition if the condition for completion cannot be satisfied or cannot be satisfied in a reasonable amount of time). For example, the condition for expiration of the partition may be the occurrence of a particular time and/or date. As another example, the condition for expiration of the partition may be that an amount of digital assets associated with the partition fails to satisfy a threshold after a particular time period has elapsed from creation of the partition. The set of parameters may include a parameter indicating one or more recipients' digital asset wallets that are to receive digital assets (e.g., cryptocurrency assets) associated with the partition upon expiration of the partition, in a similar manner as described above.

As shown by reference number 120, the enablement system may generate a smart contract associated with the partition, which may be referred to herein as the partition smart contract, to codify the set of parameters. For example, the enablement system may generate source code based on the set of parameters (e.g., the enablement system may translate the set of parameters into source code). Continuing with the example, the enablement system may compile the source code to generate the partition smart contract. Thus, the smart contract may include executable code that codifies the set of parameters.

As shown by reference number 125, the enablement system may cause the partition smart contract, that codifies the set of parameters, to be added to the distributed database 105. For example, the enablement system may transmit, to one or more nodes of the distributed database system, a request to add the partition smart contract to the distributed database 105, and the one or more nodes may cause the partition smart contract to be added to the distributed database 105. The partition smart contract may be directly or indirectly inter-related with the DAO smart contract. For example, the partition smart contract may indicate information that directly or indirectly inter-relates the partition smart contract with the DAO smart contract. In particular, as described in connection with FIG. 2, the partition smart contract may indicate a value (e.g., a hash value) associated with a chronologically preceding record in the distributed database 105. The preceding record may be the DAO smart contract (e.g., directly inter-relating the partition smart contract and the DAO smart contract). Alternatively, the preceding record may be a record that is chronologically between the partition smart contract and the DAO smart contract, and that record may indicate a value associated with a chronologically preceding record and so forth (e.g., indirectly inter-relating the partition smart contract and the DAO smart contract). By inter-relating records in this manner, tampering of the records may be difficult and easy to detect.

Figure 1B:
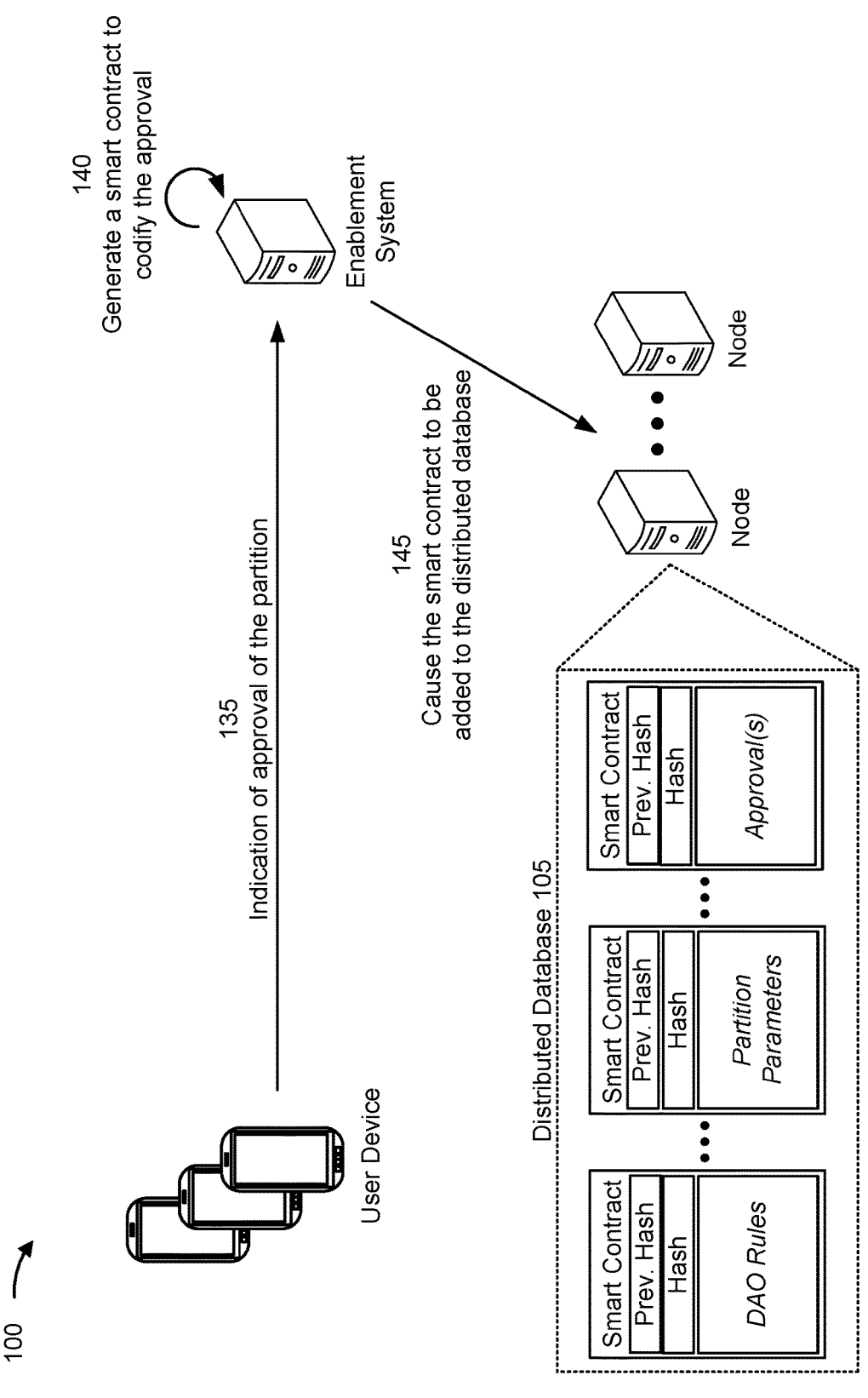

As shown in FIG. 1B, and by reference number 135, the enablement system may receive, from one or more user devices (e.g., associated with one or more owners of governance tokens of the DAO), indications of one or more approvals of the partition. Additionally, or alternatively, the enablement system may receive, from one or more other user devices (e.g., associated with owners of governance tokens of the DAO), indications of one or more rejections of the partition. In other words, token-holders of the DAO may vote on whether to approve creation of the partition. As shown by reference number 140, the enablement system may generate one or more smart contracts to codify the one or more approvals (and/or the one or more rejections), in a similar manner as described above. As shown by reference number 145, the enablement system may cause the smart contract(s) to be added to the distributed database 105, in a similar manner as described above. The addition of these smart contract(s) to the distributed database 105 may satisfy one or more conditions of the partition smart contract and thereby cause execution of the partition smart contract. For example, these smart contract(s) may indicate satisfaction of the approval threshold indicated by the partition smart contract (e.g., if the approval threshold is 51% approval, then the smart contract(s) may indicate that 51% or more of the token-holders of the DAO have approved the partition).

Figure 1C:
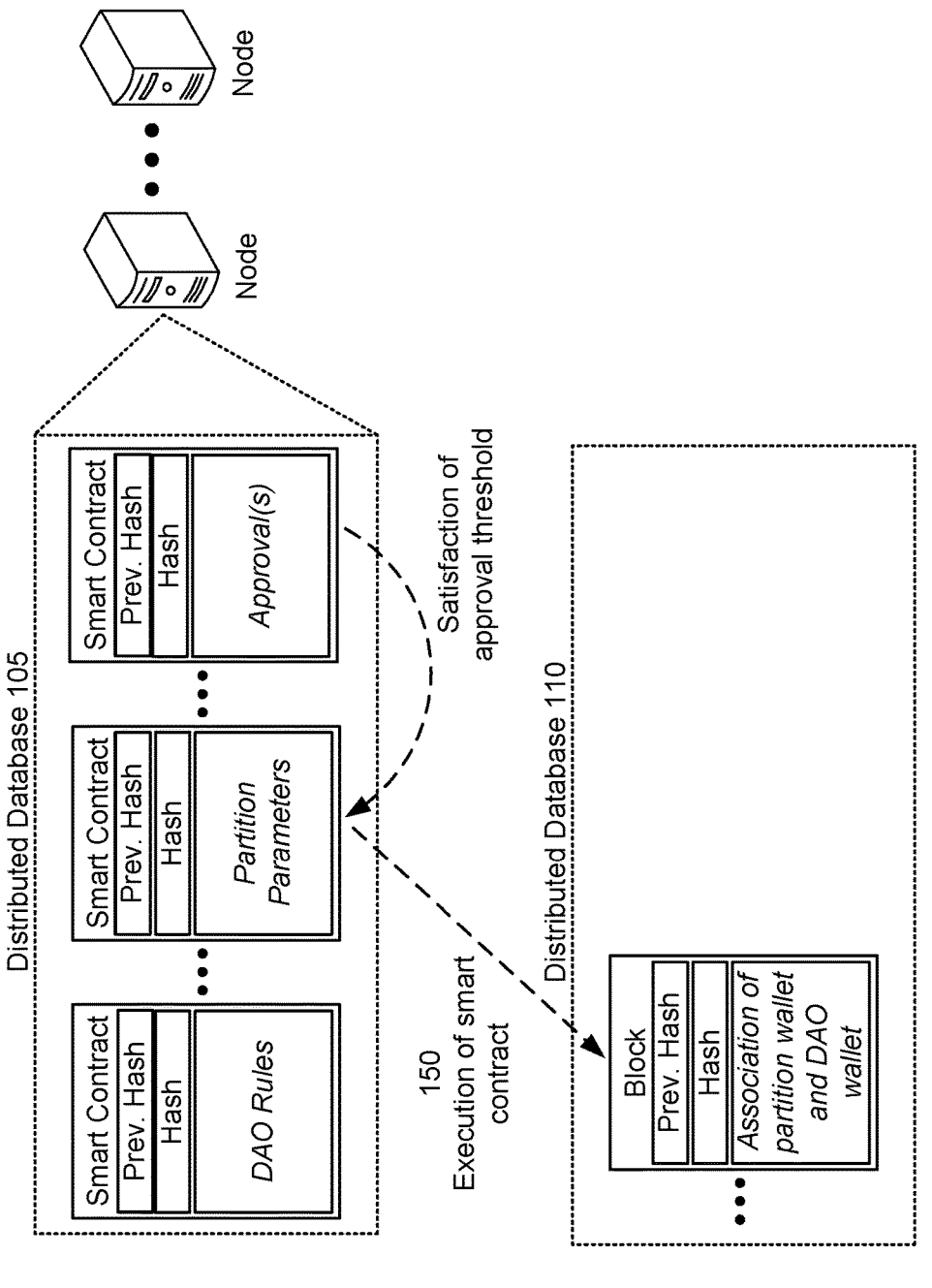

As shown in FIG. 1C, and by reference number 150, the partition smart contract may be configured such that satisfaction of the approval threshold automatically causes the partition smart contract to execute. For example, the partition smart contract may be configured to cause, responsive to the smart contract(s) indicating satisfaction of the approval threshold, creation of a digital asset wallet used for transactions relating to the partition. Creating the partition's digital asset wallet may be considered to be a creation of the partition. Additionally, or alternatively, the partition smart contract may be configured to automatically cause, responsive to the smart contract(s) indicating satisfaction of the approval threshold, a record (e.g., a block) to be added to the distributed database 110. The record may indicate an association between the partition's digital asset wallet and the DAO's digital asset wallet. For example, the partition's digital asset wallet may be identified by an address that is based on a public key associated with the partition (e.g., that was generated in connection with creation of the partition's digital asset wallet). Thus, the record may indicate an association between the address that identifies the partition's digital asset wallet and the address that identifies the DAO's digital asset wallet. As described herein, the association recorded in the record may indicate that one or more individuals and/or entities that control the DAO's digital asset wallet also control the partition's digital asset wallet.

Figure 1D:
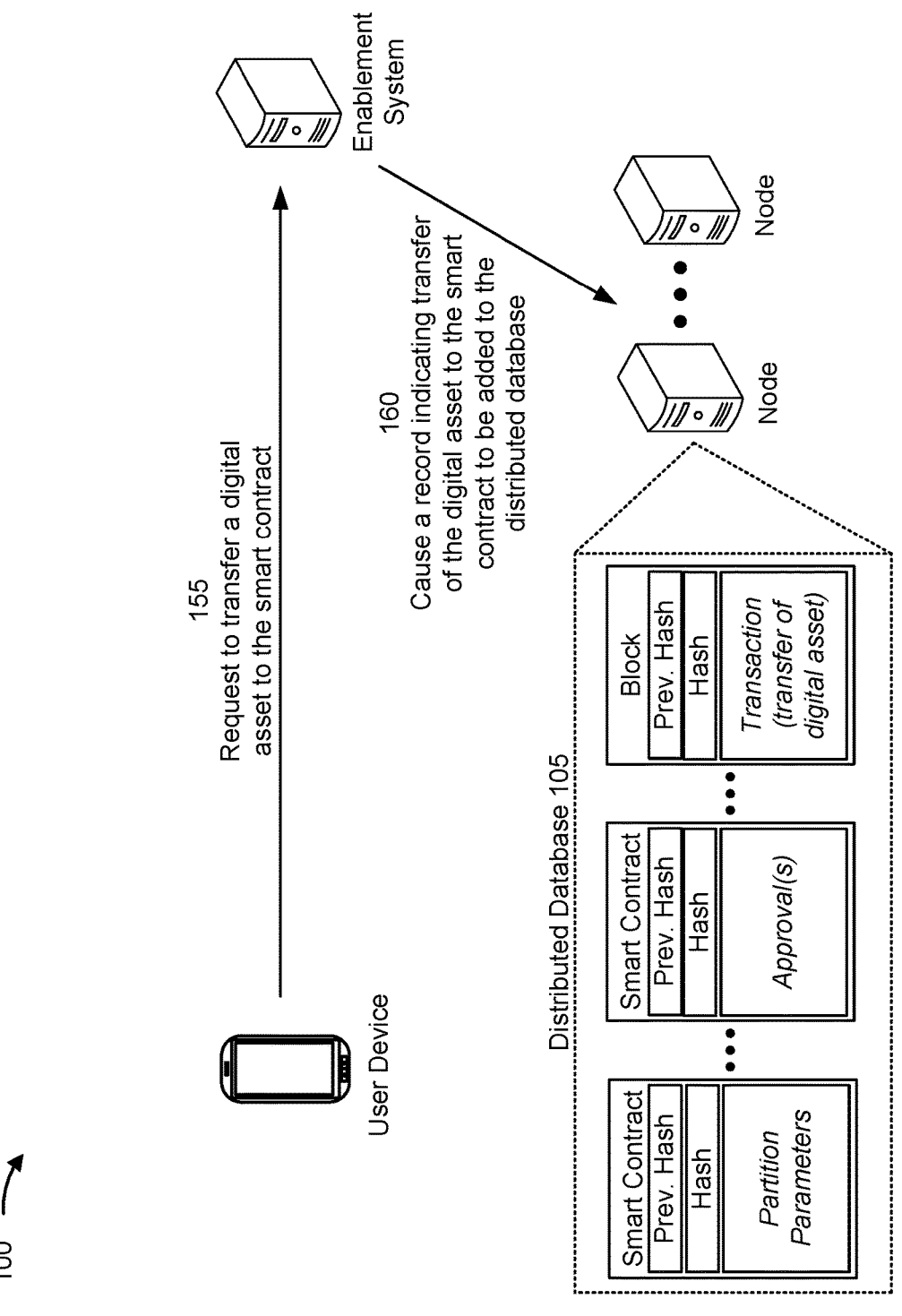

As shown in FIG. 1D, and by reference number 155, the enablement system may receive, from one or more user devices (e.g., associated with users that are token-holders of the DAO and/or users that are not token-holders of the DAO), one or more requests to transfer a digital asset (e.g., cryptocurrency assets) to the partition smart contract. For example, for a partition for raising donations for animal shelters, digital assets transferred to the partition smart contract may be the donations. As another example, for a partition for acquisition of a business by a bidder, digital assets transferred to the partition smart contract may be a bid of the bidder. As shown by reference number 160, the enablement system may cause, based on each request, a record (e.g., a block) indicating transfer of the digital asset to the partition smart contract to be added to the distributed database 105, in a similar manner as described above. For example, the record may indicate a transaction for a particular amount of the digital asset from a digital asset wallet (e.g., identified by an address) associated with the user to an address associated with the partition smart contract. The addition of these record(s) to the distributed database 105 may satisfy one or more conditions of the partition smart contract and thereby cause execution of the partition smart contract. For example, these record(s) may indicate satisfaction of the condition for completion of the partition indicated by the partition smart contract (e.g., if the condition for completion is raising a particular monetary value in donations, then the records may indicate that the particular monetary value was raised).

Figure 1E:
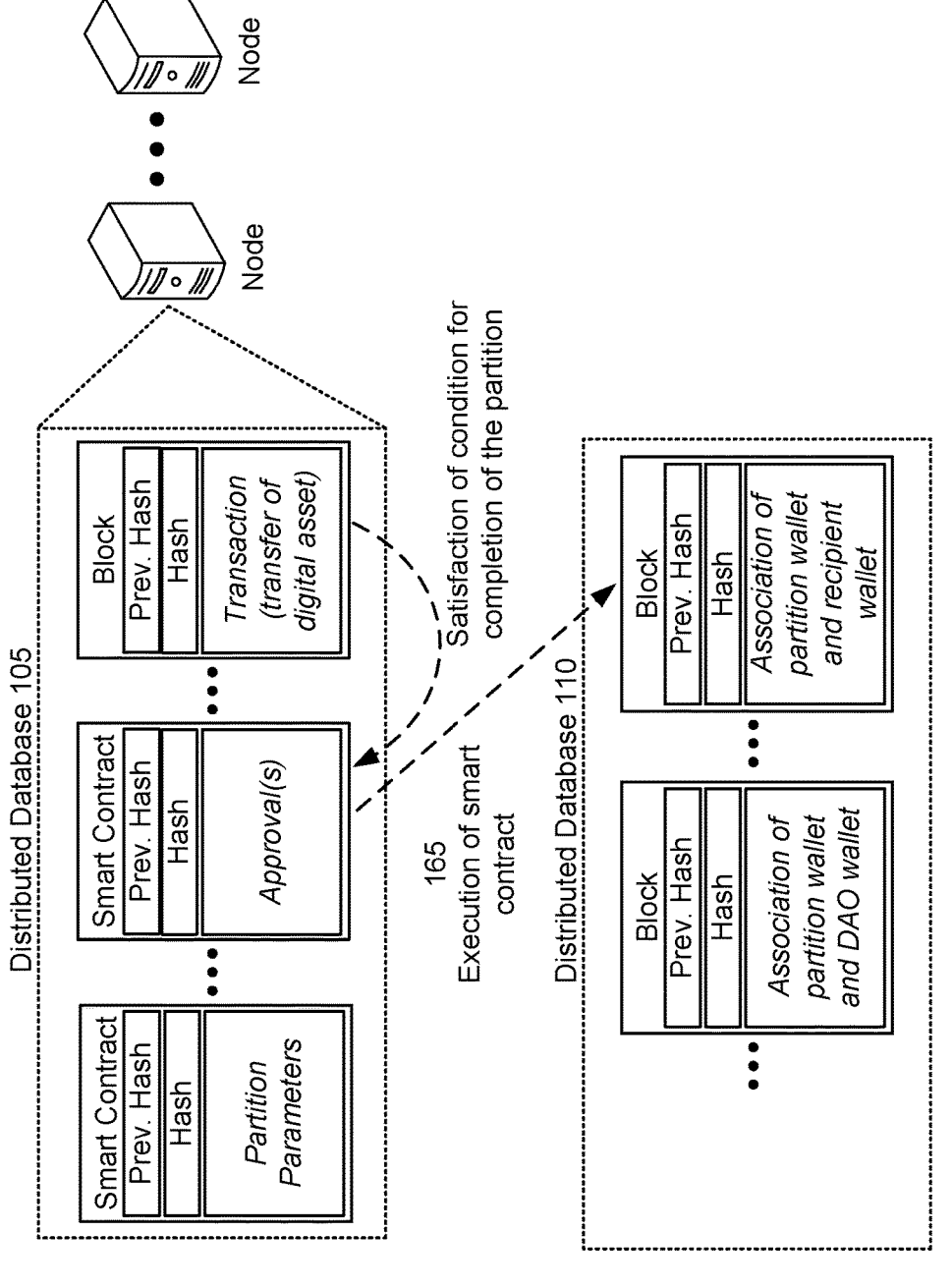

As shown in FIG. 1E, and by reference number 165, the partition smart contract may be configured such that satisfaction of the condition for completion automatically causes the partition smart contract to execute. For example, the partition smart contract may be configured to automatically cause, responsive to satisfaction of the condition for completion of the partition, a new record (e.g., a new block) to be added to the distributed database 110. The new record may indicate a new association between the partition's digital asset wallet and the recipient's digital asset wallet. For example, the record may indicate an association between the address that identifies the partition's digital asset wallet and the address that identifies the recipient's digital asset wallet. As described herein, the association recorded in the record may indicate that the partition's digital asset wallet is now linked to (e.g., transferred to) the recipient's digital asset wallet, thereby indicating that one or more individuals and/or entities that control the recipient's digital asset wallet now control the partition's digital asset wallet.

In some implementations, the condition for expiration of the partition may be satisfied (e.g., occurrence of a particular date) before the condition for completion occurs. Here, the partition smart contract may be configured such that satisfaction of the condition for expiration automatically causes the petition smart contract to execute. For example, the partition smart contract may be configured to automatically cause, responsive to satisfaction of the condition for expiration of the partition, one or more records (e.g., blocks) to be added to the distributed database 105 indicating transfer of digital assets back to users that transferred the digital assets to the petition smart contract (e.g., a return of the digital assets transferred to the smart contract). As an example, a record may indicate a transaction for a particular amount of the digital asset from an address associated with the partition smart contract to an address associated with a user (e.g., where the particular amount of the digital asset corresponds to the amount that the user transferred to the partition smart contract previously).

In this way, the partition may provide isolation between digital assets associated with the partition and digital assets of the DAO, while at the same time maintaining an association between the partition and the DAO. This enables digital assets associated with the partition to be efficiently transferred without excessive records being added to the distributed database 105. Accordingly, the partition reduces complexity in the distributed database 105 and conserves processing resources and storage resources used by the nodes in implementing the distributed database 105.

As indicated above, FIGS. 1A-1E are provided as an example. Other examples may differ from what is described with regard to FIGS. 1A-1E.

Figure 2:
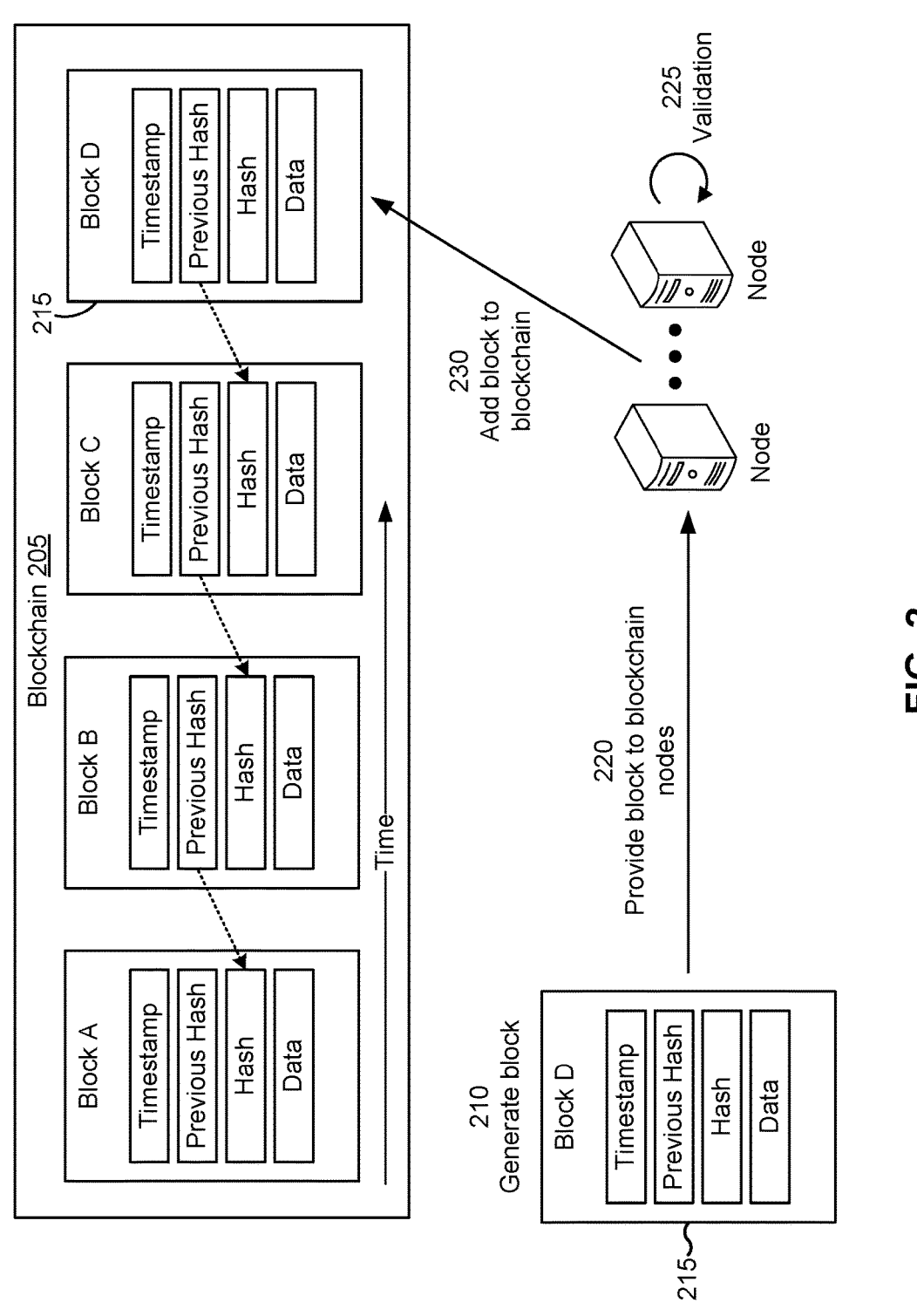
FIG. 2 is a diagram illustrating an example of a blockchain and use thereof, in accordance with some embodiments of the present disclosure.

FIG. 2 is a diagram illustrating an example 200 of a blockchain and use thereof. As shown in FIG. 2, some operations of example 200 may be performed by multiple blockchain nodes. The blockchain nodes may form a blockchain network, and a blockchain 205 may be distributed among the blockchain nodes of the blockchain network. Blockchain 205 may be a distributed ledger, or distributed database, that maintains a list of records, called blocks, that may be linked together to form a chain. In some implementations, the blockchain 205 may be a distributed database described herein. In some implementations, a block of the blockchain 205 may be a record or a smart contract, as described herein, of a distributed database.

As shown by reference number 210, a procedure for adding to blockchain 205 may begin with generating a block 215. Block 215 may be generated in response to receiving a request (e.g., from the enablement system, described herein) to add information (which may be called a transaction) to blockchain 205. In some implementations, block 215 may be generated by a blockchain node.

As shown, each block of blockchain 205, including generated block 215, indicates a timestamp, a previous hash, a hash, and data, among other examples. For block 215, the data may include the information that was requested to be added. For example, the information may include a set of parameters for a partition, indications of approval, or addresses of digital asset wallets involved in a transaction, as described herein. The timestamp, the previous hash, and the hash may define a header of a block. The hash of a block may be a hash representation (e.g., using one or more hashing methods) of the block's data, and the previous hash may be the hash value in the previous block's header. For example, the previous hash in the header of Block B may be the hash value in the header of Block A, and so forth. Thus, the blocks may be chained together by each block referencing the hash value of the previous block. In this way, an altered block may be easily detected and rejected from blockchain 205.

As shown by reference number 220, generated block 215 may be provided (e.g., broadcast) to all blockchain nodes in the blockchain network. As shown by reference number 225, before block 215 is added to blockchain 205, other blockchain nodes should agree that block 215 is valid. For example, the blockchain nodes may reach a consensus on the validity of block 215. To validate block 215, the blockchain nodes may utilize one or more consensus techniques, which may utilize a proof of work (PoW) algorithm, a proof of stake (POS) algorithm, a delegated proof of stake (DPoS) algorithm, and/or a practical Byzantine fault tolerance (PBFT) algorithm, among other examples. As shown by reference number 230, once validated, the blockchain nodes may add block 215 to their respective copies of blockchain 205.

As indicated above, FIG. 2 is provided as an example. Other examples may differ from what is described in connection with FIG. 2.

Figure 3:
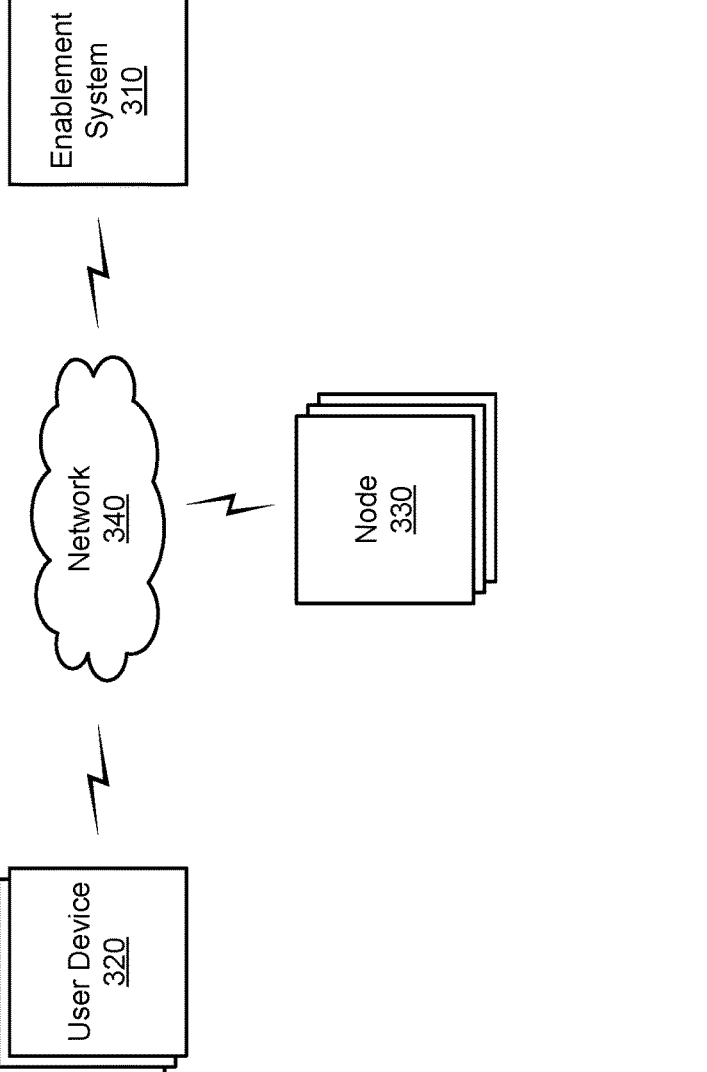
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include an enablement system 310, one or more user devices 320, multiple nodes 330 (e.g., of a distributed database system), and a network 340. Devices of environment 300 may interconnect via wired connections, wireless connections, or a combination of wired and wireless connections.

The enablement system 310 may include one or more devices capable of receiving, generating, storing, processing, providing, and/or routing information associated with using partitions within a distributed database, as described elsewhere herein. The enablement system 310 may include a communication device and/or a computing device. For example, the enablement system 310 may include a server, such as an application server, a client server, a web server, a database server, a host server, a proxy server, a virtual server (e.g., executing on computing hardware), or a server in a cloud computing system. In some implementations, the enablement system 310 may include computing hardware used in a cloud computing environment.

A user device 320 may include one or more devices capable of receiving, generating, storing, processing, and/or providing information associated with using partitions within a distributed database, as described elsewhere herein. The user device 320 may include a communication device and/or a computing device. For example, the user device 320 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

A node 330 may include one or more devices capable of receiving, generating, storing, processing, providing, and/or routing information associated with using partitions within a distributed database, as described elsewhere herein. The node 330 may include a communication device and/or a computing device. For example, the node 330 may include a server, such as an application server, a client server, a web server, a database server, a host server, a proxy server, a virtual server (e.g., executing on computing hardware), or a server in a cloud computing system. In some implementations, the node 330 may include computing hardware used in a cloud computing environment.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
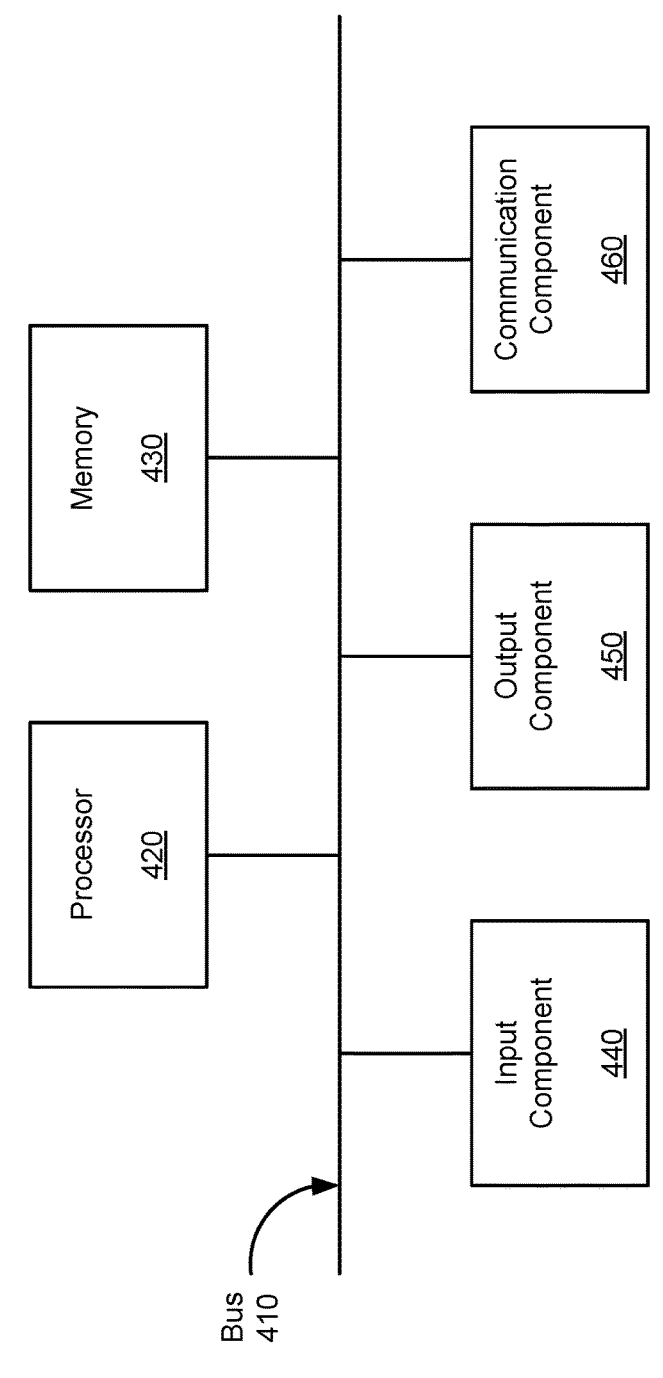
FIG. 4 is a diagram of example components of a device associated with using partitions within a distributed database, in accordance with some embodiments of the present disclosure.

FIG. 4 is a diagram of example components of a device 400 associated with using partitions within a distributed database. The device 400 may correspond to enablement system 310, user device 320, and/or node 330. In some implementations, enablement system 310, user device 320, and/or node 330 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with using partitions within a distributed database. In some implementations, one or more process blocks of FIG. 5 may be performed by the enablement system 310. In some implementations, one or more process blocks of FIG. 5 may be performed by another device or a group of devices separate from or including the enablement system 310, such as the user device 320 and/or a node 330. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving information indicating a set of parameters for a partition of a DAO implemented by a distributed database (block 510). For example, the enablement system 310 (e.g., using processor 420, memory 430, input component 440, and/or communication component 460) may receive information indicating a set of parameters for a partition of a DAO implemented by a distributed database, as described above in connection with reference number 115 of FIG. 1A. In some implementations, the set of parameters may include a first parameter indicating an approval threshold for creating the partition, a second parameter indicating a condition for completion of the partition, and a third parameter indicating a digital asset wallet of a recipient that is to receive digital assets associated with the partition upon completion of the partition. For example, if a purpose of the DAO is to provide charitable donations, a purpose of a partition of the DAO may be to raise donations for animal shelters. Continuing with the example, the first parameter may indicate that the partition is to be created if a particular proportion of owners of governance tokens of the DAO approve the partition, the second parameter may indicate that the partition is to be completed if a particular value in cryptocurrency is raised, and the third parameter may indicate an address of a digital asset wallet of an animal shelter that is to receive the cryptocurrency that is raised.

As further shown in FIG. 5, process 500 may include causing a first smart contract, associated with the partition, to be added to the distributed database, where the first smart contract includes executable code that codifies the set of parameters (block 520). For example, the enablement system 310 (e.g., using processor 420, memory 430, output component 450, and/or communication component 460) may cause a first smart contract, associated with the partition, to be added to the distributed database, wherein the first smart contract includes executable code that codifies the set of parameters, as described above in connection with reference number 125 of FIG. 1A. As an example, the first smart contract may be generated to codify the set of parameters (e.g., in executable code). Continuing with the example, a request to add the first smart contract to the distributed database may be provided to one or more nodes of a distributed database system, and the one or more nodes may cause the first smart contract to be added to the distributed database.

As further shown in FIG. 5, process 500 may include receiving indications of one or more approvals of the partition (block 530). For example, the enablement system 310 (e.g., using processor 420, memory 430, input component 440, and/or communication component 460) may receive indications of one or more approvals of the partition, as described above in connection with reference number 135 of FIG. 1B. As an example, the approvals of the partition may be received from one or more user devices associated with one or more owners of governance tokens of the DAO.

As further shown in FIG. 5, process 500 may include causing one or more second smart contracts, indicating the one or more approvals, to be added to the distributed database (block 540). For example, the enablement system 310 (e.g., using processor 420, memory 430, output component 450, and/or communication component 460) may cause one or more second smart contracts, indicating the one or more approvals, to be added to the distributed database, as described above in connection with reference number 145 of FIG. 1B. In some implementations, the first smart contract may be configured to cause, responsive to the one or more second smart contracts indicating satisfaction of the approval threshold, creation of a digital asset wallet for the partition and a record to be added to an additional distributed database indicating an association between the digital asset wallet for the partition and a digital asset wallet for the DAO. In some implementations, the first smart contract is configured to cause, responsive to satisfaction of the condition for completion of the partition, another record to be added to the additional distributed database indicating a new association between the digital asset wallet of the partition and the digital asset wallet of the recipient. As an example, if the approval threshold is satisfied by the received approvals, then a digital asset wallet for the partition may be created and a record indicating that the digital asset wallet of the partition is associated with a digital asset wallet of the DAO may be added to an additional distributed database. Continuing with the example, if the condition for competition of the partition is satisfied (e.g., the particular value of cryptocurrency is raised), then another record may be added to the additional distributed database indicating that the digital asset wall of the partition is now associated with the digital asset wallet of the recipient (e.g., the animal shelter).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1E. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for using partitions within a distributed database, the system comprising:
  one or more memories; and
  one or more processors, communicatively coupled to the one or more memories, configured to:
    receive information indicating a first parameter indicating an approval threshold for creating a partition of a decentralized autonomous organization (DAO) implemented by the distributed database, a second parameter indicating a condition for completion of the partition, and a third parameter indicating a digital asset wallet of a recipient that is to receive digital assets associated with the partition upon completion of the partition;
    generate, based on the parameters, executable code that codifies the parameters;
    compile the executable code to generate a first smart contract, associated with the partition, wherein the first smart contract includes a hash value associated with a smart contract indicating one or more rules of the DAO;
    transmit, to one or more nodes of the distributed database, a request to add the first smart contract to the distributed database;
    receive indications of one or more approvals of the partition;
    generate one or more second smart contracts indicating the one or more approvals, wherein the one or more second smart contracts indicate satisfaction of the approval threshold indicated by the first parameter;
    transmit, to one or more nodes of the distributed database, a request to add the one or more second smart contracts to the distributed database;
    add, by one or more nodes of the distributed database, the one or more second smart contracts to the distributed database based on the request;
    execute, by one or more nodes of the distributed database, the first smart contract;
    create, based on executing the first smart contract and in response to the one or more second smart contracts indicating satisfaction of the approval threshold indicated by the first parameter, a digital asset wallet for the partition;
    transmit, based on executing the first smart contract and in response to the one or more second smart contracts indicating satisfaction of the approval threshold indicated by the first parameter, a request to add a record to an additional distributed database indicating an association between the digital asset wallet for the partition and a digital asset wallet for the DAO; and
transmit a request to add, based on executing the first smart contract and in response to satisfaction of the condition for completion of the partition indicated by the second parameter, another record to the additional distributed database indicating a new association between the digital asset wallet of the partition and the digital asset wallet of the recipient indicated by the third parameter.

2. The system of claim 1,
wherein the one or more processors are further configured to:
  receive a request to transfer a digital asset to the first smart contract; and
  cause, based on the request, a record indicating transfer of the digital asset to the first smart contract to be added to the distributed database.

3. The system of claim 1,
wherein the condition for completion of the partition is that a value of digital assets for the partition satisfies a threshold.

4. The system of claim 1,
wherein the digital asset wallet of the recipient is identified by a first address based on a first public key associated with the recipient,
  wherein the digital asset wallet of the partition is identified by a second address based on a second public key associated with the partition, and
  wherein the digital asset wallet of the DAO is identified by a third address based on a third public key associated with the DAO.

5. The system of claim 1,
wherein the third parameter indicates that the digital asset wallet of the recipient is to receive the digital assets associated with the partition upon completion of the partition if a first condition is satisfied, and
  wherein the third parameter indicates that a digital asset wallet of a different recipient is to receive the digital assets associated with the partition upon completion of the partition if a second condition is satisfied.

6. The system of claim 1,
wherein the first smart contract is directly or indirectly inter-related in the distributed database with the smart contract indicating the one or more rules of the DAO.

7. The system of claim 1,
wherein the distributed database is a blockchain.

8. A method of using partitions within a distributed database, comprising:
  receiving information indicating a first parameter indicating an approval threshold for creating a partition of a decentralized autonomous organization (DAO) implemented by the distributed database, a second parameter indicating a condition for completion of the partition, and a third parameter indicating a digital asset wallet of a recipient that is to receive digital assets associated with the partition upon completion of the partition;
  generating, based on the parameters, executable code that codifies the parameters;
  compiling the executable code to generate a first smart contract, associated with the partition, wherein the first smart contract includes a hash value associated with a smart contract indicating one or more rules of the DAO;

transmitting, to one or more nodes of the distributed database, a request to add the first smart contract to the distributed database;

receiving indications of one or more approvals of the partition;

generating one or more second smart contracts indicating the one or more approvals, wherein the one or more second smart contracts indicate satisfaction of the approval threshold indicated by the first parameter;

transmitting, to one or more nodes of the distributed database, a request to add the one or more second smart contracts to the distributed database;

adding, by one or more nodes of the distributed database, the one or more second smart contracts to the distributed database based on the request;

executing, by one or more nodes of the distributed database, the first smart contract;

creating, based on executing the first smart contract and in response to the one or more second smart contracts indicating satisfaction of the approval threshold indicated by the first parameter, a digital asset wallet for the partition;

transmitting, based on executing the first smart contract and in response to the one or more second smart contracts indicating satisfaction of the approval threshold indicated by the first parameter, a request to add a record to an additional distributed database indicating an association between the digital asset wallet for the partition and a digital asset wallet of the DAO; and transmitting, based on executing the first smart contract and in response to satisfaction of the condition for completion of the partition indicated by the second parameter, a request to add another record to the additional distributed database indicating a new association between the digital asset wallet for the partition and the digital asset wallet of the recipient indicated by the third parameter.

9. The method of claim 8, further comprising:

receiving a request to transfer a digital asset to the first smart contract; and causing, based on the request, a record indicating transfer of the digital asset to the first smart contract to be added to the distributed database.

10. The method of claim 8, wherein the indications of the one or more approvals of the partition are received from one or more devices associated with one or more owners of governance tokens of the DAO.

11. The method of claim 8, wherein the digital asset wallet of the recipient is identified by a first address based on a first public key associated with the recipient, wherein the digital asset wallet of the partition is identified by a second address based on a second public key associated with the partition, and wherein the digital asset wallet of the DAO is identified by a third address based on a third public key associated with the DAO.

12. The method of claim 8, wherein the digital assets are cryptocurrency assets.

13. The method of claim 8, wherein a schema for the distributed database is different from a schema for the additional distributed database.

14. A non-transitory computer-readable medium storing a set of instructions for using partitions within a distributed database, the set of instructions comprising:

one or more instructions that, when executed by one or more processors of a device, cause the device to:

receive information indicating a first parameter indicating an approval threshold for creating a partition of a decentralized autonomous organization (DAO) implemented by the distributed database, a second parameter indicating a condition for completion of the partition, and a third parameter indicating a digital asset wallet of a recipient that is to receive digital assets associated with the partition upon completion of the partition;

generate, based on the parameters, executable code that codifies the parameters;

compile the executable code to generate a first smart contract, associated with the partition, wherein the first smart contract includes a hash value associated with a smart contract indicating one or more rules of the DAO;

transmit, to one or more nodes of the distributed database, a request to add the first smart contract to the distributed database;

receive indications of one or more approvals of the partition;

generate one or more second smart contracts indicating the one or more approvals, wherein the one or more second smart contracts indicate satisfaction of the approval threshold indicated by the first parameter;

transmit, to one or more nodes of the distributed database, a request to add the one or more second smart contracts to the distributed database;

add, by one or more nodes of the distributed database, the one or more second smart contracts to the distributed database based on the request;

execute, by one or more nodes of the distributed database, the first smart contract;

create, based on executing the first smart contract and in response to the one or more second smart contracts indicating satisfaction of the approval threshold indicated by the first parameter, a digital asset wallet for the partition;

transmit, based on executing the first smart contract and in response to the one or more second smart contracts indicating satisfaction of the approval threshold indicated by the first parameter, a request to add a record to an additional distributed database indicating an association between the digital asset wallet for the partition and a digital asset wallet of the DAO; and transmit a request to add, based on executing the first smart contract and responsive to satisfaction of the condition for completion of the partition indicated by the second parameter, another record to an additional distributed database indicating a new association between the digital asset wallet for the partition and the digital asset wallet of the recipient indicated by the third parameter.

15. The non-transitory computer-readable medium of claim 14, wherein the first smart contract is configured to cause, responsive to satisfaction of a condition for expiration of the partition, a return of digital assets transferred to the first smart contract.

16. The non-transitory computer-readable medium of claim 14, wherein the digital asset wallet of the recipient is identified by a first address based on a first public key associated with the recipient, wherein the digital asset wallet of the partition is identi-
fied by a second address based on a second public key
associated with the partition, and wherein the digital asset wallet of the DAO is identified
by a third address based on a third public key associated
with the DAO.

17. The non-transitory computer-readable medium of
claim 14, wherein the distributed database is a blockchain.

18. The system of claim 1, wherein the one or more processors are further configured
to:

receive information indicating a fourth parameter par-
tition indicating a purpose of the partition, wherein
the purpose of the partition is associated with a
general purpose of the DAO.

19. The method of claim 8, wherein the condition for completion of the partition is
that a value of digital assets for the partition satisfies a
threshold.

20. The method of claim 8, wherein the first smart contract is configured to cause,
responsive to satisfaction of a condition for expiration
of the partition, a return of digital assets transferred to
the first smart contract.

* * * * *